United States Patent
Lee et al.

(10) Patent No.: US 11,476,965 B2
(45) Date of Patent: Oct. 18, 2022

(54) OPTICAL LINE TERMINAL

(71) Applicant: DZS Inc., Plano, TX (US)

(72) Inventors: Seung Dong Lee, Fremont, CA (US); Jae Goo Kim, Suwon-si (KR)

(73) Assignee: DZS Inc., Plano, TX (US)

(*) Notice: Subject to any disclaimer, the term of this patent is extended or adjusted under 35 U.S.C. 154(b) by 0 days.

(21) Appl. No.: 17/240,966

(22) Filed: Apr. 26, 2021

(65) Prior Publication Data

US 2022/0140909 A1    May 5, 2022

Related U.S. Application Data

(60) Provisional application No. 63/110,238, filed on Nov. 5, 2020.

(51) Int. Cl.
*H04J 14/02* (2006.01)
*H04B 10/40* (2013.01)
*H04Q 11/00* (2006.01)

(52) U.S. Cl.
CPC .......... *H04J 14/0216* (2013.01); *H04B 10/40* (2013.01); *H04Q 11/0005* (2013.01); *H04Q 2011/0009* (2013.01); *H04Q 2011/0016* (2013.01)

(58) Field of Classification Search
CPC . H04B 10/40; H04J 14/0216; H04Q 11/0005; H04Q 2011/0009; H04Q 2011/0016
USPC ......................................................... 398/135
See application file for complete search history.

(56) References Cited

U.S. PATENT DOCUMENTS

| 7,254,330 | B2 | 8/2007 | Pratt et al. | |
|---|---|---|---|---|
| 2008/0095541 | A1 | 4/2008 | Dallesasse | |
| 2014/0348468 | A1* | 11/2014 | Lagziel | G02B 6/4284 29/825 |
| 2014/0355984 | A1 | 12/2014 | Yuan | |
| 2015/0311997 | A1* | 10/2015 | Boyd | H04B 10/40 398/68 |
| 2021/0281933 | A1* | 9/2021 | Sang | H04Q 11/00 |

(Continued)

FOREIGN PATENT DOCUMENTS

| CN | 111698582 A | * 9/2020 |
|---|---|---|
| CN | 215221088 U | * 12/2021 |

OTHER PUBLICATIONS

Non-final office action and listed of cited references dated Jul. 14, 2022 for U.S. Appl. No. 17/385,871.

*Primary Examiner* — Dalzid E Singh
(74) *Attorney, Agent, or Firm* — Insight Law Group, PLLC; Seung Lee (57) ABSTRACT

An optical line terminal (OLT) includes: a first optical transceiver and a second optical transceiver each configured to transmit or receive at least one optical signal among an optical signal of a first standard and an optical signal of a second standard through an optical cable inserted thereinto, and convert between an optical signal and an electrical signal; a first connector configured to electrically connect an extended output terminal of an electrical signal input/output unit of the first transceiver and an extended output terminal of an electrical signal input/output unit of the second optical transceiver; and a second connector configured to selectively connect the extended output terminal and a default output terminal of the electrical signal input/output unit of the second optical transceiver.

14 Claims, 5 Drawing Sheets

(56) References Cited

U.S. PATENT DOCUMENTS

2021/0328674 A1* 10/2021 Zhang ................ H04Q 11/0067
2021/0396933 A1   12/2021 Mosti et al.

* cited by examiner

OPTICAL LINE TERMINAL

CROSS-REFERENCE TO RELATED APPLICATIONS

This application claims priority from U.S. Provisional Patent Application No. 63/110,238, filed on Nov. 5, 2020, in the U.S. Patent and Trademark Office, the disclosure of which is incorporated herein by reference in its entirety

BACKGROUND

1. Field

The following description relates to an optical line terminal, and more particularly, to an optical line terminal supporting a plurality of passive optical communication transmission standards.

2. Description of Related Art

Subscriber network technology using an optical cable medium is classified into active optical network technology and passive optical network (PON) technology. An active optical network is a device such as an Ethernet switch or a router in which an optical signal splitting device requires a power source, and a PON splits an optical signal using a splitter that does not require a power source.

PONs are classified into a time-division multiplexing (TDM)-PON, a wavelength-division multiplexing (WDM)-PON, and a time-and-wavelength-division multiplexing (TWDM)-PON according to a multiplexing method of an upstream signal, and the TDM-PON is generally used. A G-PON, an E-PON, an XG-PON, and an XGS-PON, which are used as optical subscriber network technologies of communication carriers, are examples of the TDM-PON.

The G-PON is a technology designed to simultaneously support ATM and Ethernet and complies with the ITU-T G. 984 standard. The G-PON is a technology supporting an upstream/downstream 1.25 Gbps transmission rate and is an abbreviation of Gigabit-capable PON. The E-PON is a technology specialized for Ethernet, is an abbreviation of Ethernet-PON, and complies with the IEEE 802.3ah EFM standard.

The XG-PON and the XGS-PON are technologies developed after the G-PON and are designed to support 10 Gbps. The XG-PON supports asymmetric transmission rates of 10 Gbps downstream and 1 Gbps upstream and complies with the ITU-T G. 987 standard, and the XGS-PON supports a symmetric transmission rate of 10 Gbps upstream/downstream and complies with the ITU-T G. 988 standard.

The PON consists of an optical line terminal (OLT), a splitter, an optical network unit (ONU), and an optical network terminal (ONT), and the OLT aggregates an upstream traffic signal transmitted from the ONT and transmits the concentrated upstream traffic signal to the Internet while transmitting a downstream traffic signal to subscribers by a broadcast method.

Currently, there is a trend that in the case of the PON, the already built G-PON is being replaced with the XGS-PON. However, unlike the OLT that is relatively easy to replace, the ONT (or the ONU) is difficult to replace at one time. Thus, in general, the OLT should support two standards at the same time. Although different standards may be used for ports of the OLT, optical signals of two standards may be transmitted through one optical cable and used by being separated from each other by the OLT.

In general, at each port of the OLT, small form-factor pluggable (SFP) or SPF+ optical transceivers are installed and used, and two standards may coexist for some SFP+ optical transceivers so that transmitted optical signals may be processed by both the G-PON and the XGS-PON. However, because both two standards should be supported by one optical transceiver, an electrical signal converted from an optical signal by the optical transceiver should be output through a corresponding output terminal. Therefore, in order to identify and process two signals from the optical transceiver supporting two standards, an internal electrical path of the OLT should be designed differently than when one standard is handled. That is, two electrical signal transmission paths should be connected to one port into which the optical transceiver is inserted. Therefore, a waste of resources occurs when an optical signal of only one standard is input through an optical cable connected to the optical transceiver.

Even an OLT supporting two standards at the same time should be required to be used flexibly in various environments without causing a waste of resources.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing an optical line terminal capable of supporting two standards and processing an optical signal without wasting resources, even when only an optical signal of one standard is input to each port.

In a general aspect, an optical line terminal includes a first optical transceiver, a second optical transceiver, a first connector, and a second connector.

The first optical transceiver transmits or receives at least one optical signal among an optical signal of a first standard and an optical signal of a second standard through an optical cable inserted thereinto, and converts between an optical signal and an electrical signal.

The second optical transceiver is installed at a port adjacent to a port at which the first optical transceiver is installed, and configured to transmit or receive an optical signal of the first or second standard through an optical cable inserted thereinto and convert between an optical signal and an electrical signal.

The first connector electrically connects an extended output terminal of an electrical signal input/output unit of the first transceiver and an extended output terminal of an electrical signal input/output unit of the second optical transceiver.

The second connector selectively connects the extended output terminal and a default output terminal of the electrical signal input/output unit of the second optical transceiver.

In another general aspect, the first connector may be formed in a pattern on a printed circuit board (PCB) provided with the first optical transceiver and the second optical transceiver.

In another general aspect, the second connector may include a fastening portion formed in the same shape as an optical connector inserted into the second optical transceiver to be detachably fastened into the second optical transceiver, and a bridge portion configured to electrically connect the default output terminal and the extended output terminal of the electrical signal input/output unit of the second optical transceiver when the fastening portion is fastened into the second optical transceiver.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and further aspects are implemented through embodiments described with reference to the accompanying drawings below. It should be understood that components of embodiments can be implemented in various combinations in the embodiments unless mentioned otherwise and as long as there is no contradiction between components. Each block of block diagrams may represent a physical component in some cases, but may be a logical representation of part of functions of a physical component or a function performed by a plurality of physical components. In some cases, an entity of a block or part thereof may be a set of program instructions. All or some of such blocks may be implemented by hardware, software or a combination thereof.

A mode in which optical signals of two different standards are used is defined as a coexistence mode or a combo mode. For example, an OLT and an optical transceiver that each simultaneously support the G-PON and the XGS-PON are defined as a combo OLT and a combo optical transceiver, respectively.

Figure 1:
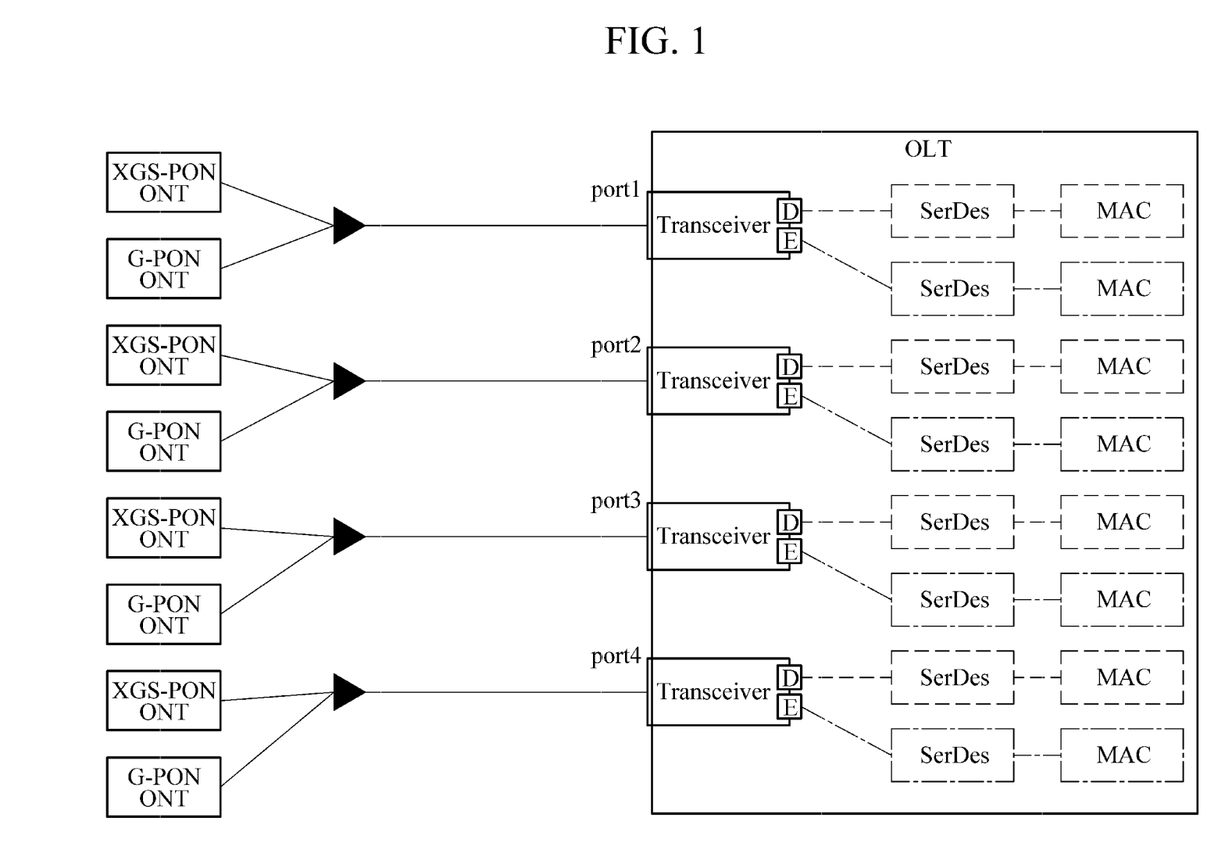
FIG. 1 illustrates an example of a combo OLT PON architecture of the related art that simultaneously supports an XGS-PON transmission standard and a G-PON transmission standard.

FIG. 1 illustrates an example of a combo OLT PON architecture of the related art that simultaneously supports an XGS-PON transmission standard and a G-PON transmission standard. An example in which a combo OLT illustrated in FIG. 1 includes four optical ports and four combo optical transceivers are respectively installed at the optical ports is illustrated. One optical cable is inserted into the combo optical transceiver installed at each of the optical ports to transmit a G-PON optical signal and an XGS-PON optical signal simultaneously. Between the OLT and ONTs, the G-PON optical signal may use a wavelength of 1310 nm upstream and 1490 nm downstream, and the XGS-PON optical signal may use a wavelength of 1270 nm upstream and 1577 nm downstream. When a 1490-nm optical signal and a 1577-nm optical signal are transmitted through an optical cable, a G-PON ONT receives and processes only the 1490-nm optical signal, which is a G-PON optical signal, and an XGS-PON ONT receives and processes only the 1577-nm optical signal, which is an XGS-PON optical signal. On the other hand, the OLT should be capable of simultaneously transmitting the G-PON optical signal and the XGS-PON optical signal, and separating the optical signals of two standards, which are transmitted simultaneously from ONTs through one optical cable, and converting the optical signals into two electrical signals. The OLT of FIG. 1 shows a concept of outputting two electrical signals through one optical transceiver. Generally, an SFP or SFP+ optical transceiver outputs an electrical signal through one input/output (I/O) terminal that is a default output terminal. Some of the I/O terminals are reserved for extension and are referred to as extended output terminals. The combo optical transceiver is designed to divide and output two electrical signals through the default output terminal and an extended output terminal, respectively, and the OLT is designed to internally divide electrical signal paths. FIG. 1 illustrates that each of a default output terminal D and an extended output terminal E of the optical transceiver installed at each port is electrically connected to one of SerDes ports of semiconductor chips or an FPGA for dealing with a PON protocol. In the example of FIG. 1, the combo optical transceiver outputs an electrical signal converted from the XGS-PON optical signal through the default output terminal D and outputs an electrical signal converted from the G-PON optical signal through the extended output terminal E. In the combo OLT of the related art, combo optical transceivers are installed at all ports and thus no problem occurs when a combo signal is processed. However, when the combo OLT of the related art is used in an optical network in which an existing G-PON and an existing XGS-PON coexist, a waste of OLT resources may occur during switching between the G-PON and the XGS-PON.

Figure 2:
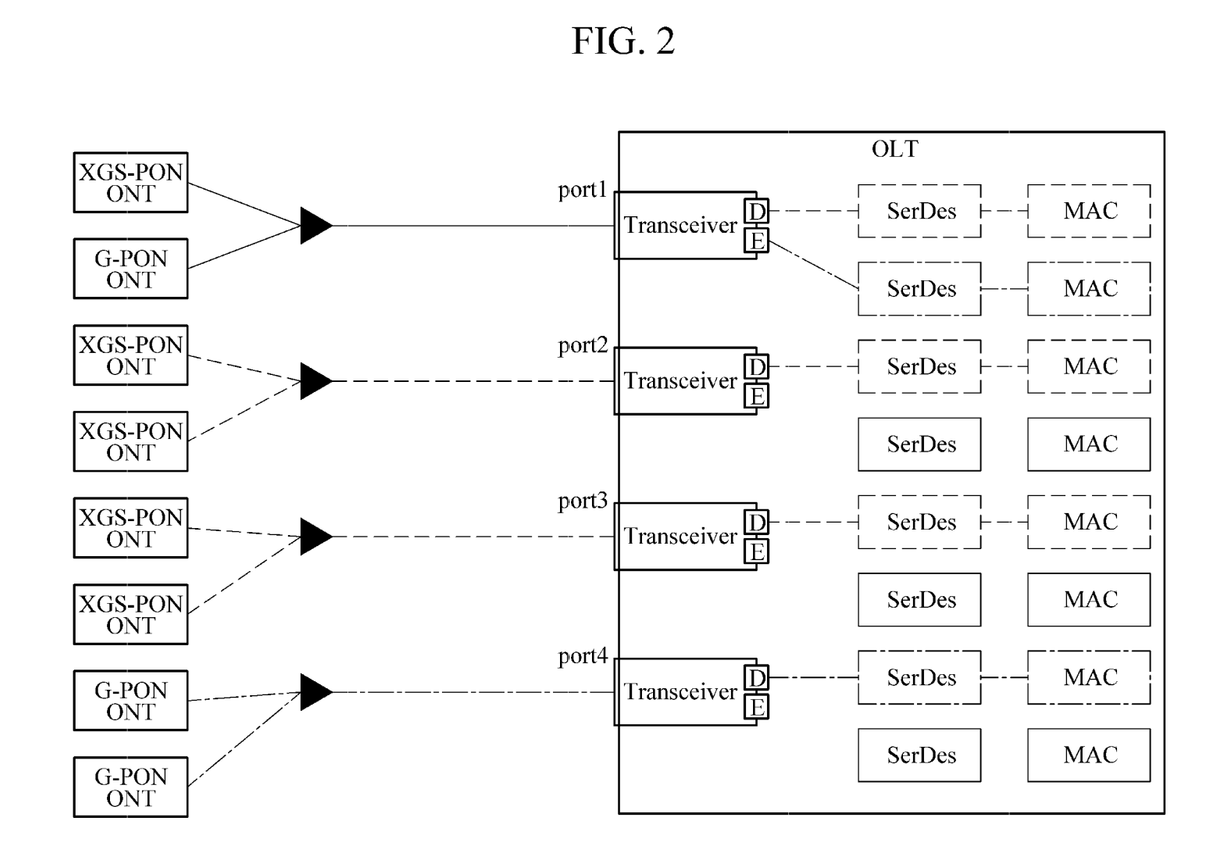
FIG. 2 illustrates an example in which optical signals of different transmission standards are input to a combo OLT that simultaneously supports an XGS-PON and a G-PON.

FIG. 2 illustrates an example in which optical signals of different transmission standards are input to a combo OLT that simultaneously supports an XGS-PON and a G-PON. An OLT illustrated in FIG. 2 corresponds to the combo OLT of the related art shown in FIG. 1, and a case in which an XGS-PON optical signal and a G-PON optical signal are simultaneously received through a port 1, only XGS-PON optical signals are received through a port 2 and a port 3, and only G-PON optical signals are received through a port 4 is illustrated. A combo optical transceiver may be installed at each port or installed only at the port 1. Because default output ports are used, excluding only the optical transceiver at the port 1, some ports connected to the semiconductor chip for dealing with the PON protocol may not be available. In addition, because the combo OLT of the related art is designed for the use of combo optical transceivers, it is not possible to flexibly cope in such an optical network without wasting resources.

Figure 3:
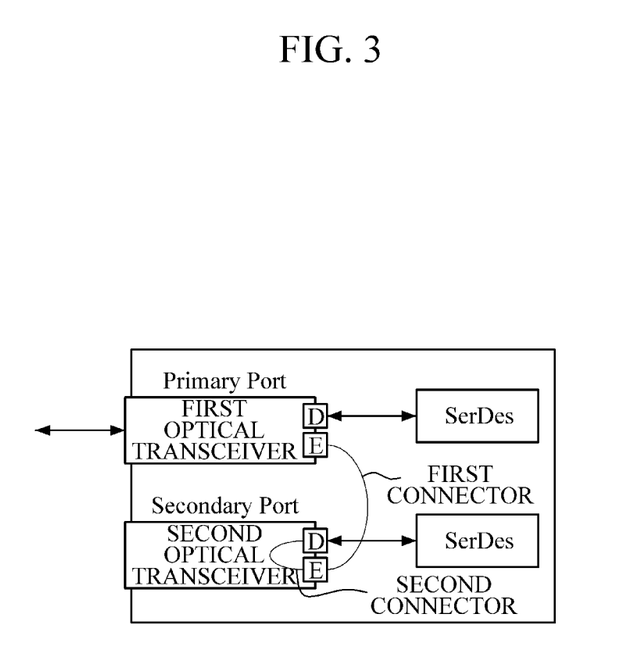
FIG. 3 illustrates a concept of signal transmission by an optical transceiver of a combo OLT according to an embodiment of the following description.

FIG. 3 illustrates a concept of signal transmission by an optical transceiver of a combo OLT according to an embodiment of the following description. In a general aspect, an optical line terminal includes a first optical transceiver, a second optical transceiver, a first connector, and second connector.

The first optical transceiver transmits or receives at least one among an optical signal of a first standard and an optical signal of a second standard through an optical cable inserted thereinto, and converts between an optical signal and an electrical signal. The first optical transceiver is an SFP or SFP+ optical transceiver. An optical cable with an LC optical connector may be inserted into the first optical transceiver, and one of optical signals of two standards may be transmitted or both the optical signals may be simultaneously transmitted through the optical cable. The first optical transceiver includes an electrical signal I/O unit through which an electrical signal is input or output, and the electrical signal I/O unit includes a default output terminal D and an extended output terminal E as shown in FIG. 3. The first optical transceiver is configured to, when optical signals of two standards are received at the same time through the optical cable inserted thereinto, separate the optical signals, convert the optical signals into electrical signals, and respectively output the electrical signals through the default output terminal D and the extended output terminal E. The first optical transceiver is configured to, when one optical signal is received through the optical cable, output an electrical signal through the default output terminal D. For example, when an XGS-PON optical signal and a G-PON optical signal are received at the same time through the optical cable, an electrical signal converted from the XGS-PON optical signal is output through the default output port and an electrical signal converted from the G-PON optical signal is output through the extended output port. Conversely, the electrical signal converted from the G-PON optical signal may be output through the default output terminal D, and the electrical signal converted from the XGS-PON optical signal may be output through the extended output terminal E.

The second optical transceiver is installed at a port adjacent to the port at which the first optical transceiver is installed, and transmits or receives an optical signal of the first or second standard through the cable inserted thereinto and converts between an optical signal and an electrical signal. The second optical transceiver is an SFP or SFP+ optical transceiver. An optical cable with an LC optical connector may be inserted into the second optical transceiver, and one of optical signals of two standards may be transmitted through the optical cable. The second optical transceiver includes an electrical signal I/O unit through which an electrical signal is input or output, and the electrical signal I/O unit includes a default output terminal D and an extended output terminal E as shown in FIG. 3. When optical signals are simultaneously received through the optical cable inserted into the second optical transceiver, the second optical transceiver converts the optical signals into electrical signals and outputs the electrical signals through the default output terminal D. The second optical transceiver may transmit only electrical signals while an optical cable is not inserted thereinto.

When the two ports at which the first and second optical transceivers are installed are grouped into one group and thus the first and second optical transceivers operate in a combo mode, an optical cable is not inserted into the second optical transceiver. Optical signals of two standards are transmitted through the optical cable inserted into the first optical transceiver.

The first connector electrically connects the extended output terminal E of the electrical signal I/O unit of the first transceiver and the extended output terminal E of the electrical signal I/O unit of the second optical transceiver. Thus, when the first optical transceiver and the second optical transceiver operate in the combo mode, the first connector transmits an electrical signal output through the extended output terminal E of the first optical transceiver to the extended output terminal E of the second optical transceiver. When the first optical transceiver and the second optical transceiver operate independently, an electrical signal is not output through both the extended output terminals E of the first and second optical transceivers, and thus the first connector does not have an influence on optical signal processing even when the first and second optical transceivers do not operate in the combo mode.

The second connector selectively connects the extended output terminal E and the default output terminal D of the electrical signal I/O unit of the second optical transceiver. Unlike the first connector, the second connector is selectively connected only when the first optical transceiver and the second optical transceiver are grouped into a group and operate in the combo mode. When the second connector is selectively connected, an electrical signal output through the extended output terminal E of the first optical transceiver is input through the extended output terminal E of the second optical transceiver electrically connected to the first optical transceiver through the first connector, and is output by being transmitted to the default output terminal D of the first optical transceiver through the second connector.

Figure 4:
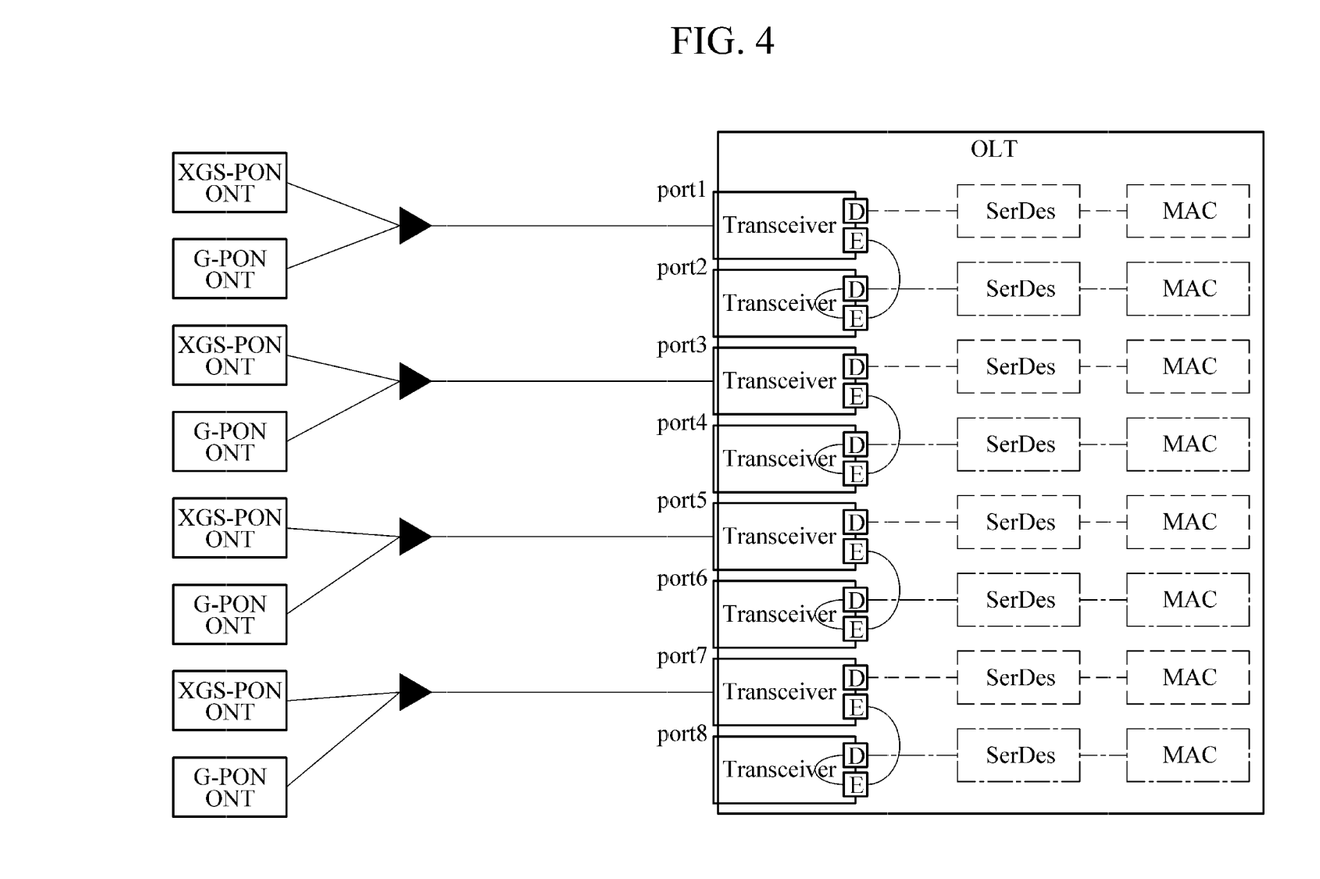
FIG. 4 illustrates an example of an architecture of a combo OLT according to an embodiment of the following description.

FIG. 4 illustrates an example of an architecture of a combo OLT according to an embodiment of the following description. In the combo OLT of FIG. 4, eight optical ports are provided unlike in the OLT of the related art shown in FIG. 1, an optical transceiver is installed at each port, and combo optical transceivers are installed at a port 1, a port 3, a port 5, and a port 7. Optical transceivers may be installed at a port 2, a port 4, a port 6, and a port 8, and may be combo optical transceivers or special optical transceivers from which an optical module is removed. The special optical transceivers are referred to as dummy transceivers. One optical cable is inserted into the combo optical transceiver installed at each of the port 1, the port 3, the port 5, and the port 7 to process a G-PON optical signal and an XGS-PON optical signal simultaneously. Similar to the OLT of FIG. 1, the combo optical transceiver of FIG. 4 shows a concept in which one optical transceiver outputs two electrical signals. Generally, an SFP or SFP+ optical transceiver outputs an electrical signal through one input/output (I/O) terminal that is a default output terminal. Some of the I/O terminals are reserved for extension and are referred to as extended output terminals. The combo optical transceiver divides and outputs two electrical signals through a default output terminal and an extended output terminal, respectively. In this case, unlike the OLT of the related art shown in FIG. 1, an OLT of the following description is designed to separate electrical signal paths according to ports. In this case, the port 1 and port 2 are set as one group for processing combo signals, and the port 3, the port 4, the port 5, the port 6, the port 7 and the port 8 are set as one group. An output of the extended output terminal E of the combo optical transceiver installed at the port 1 is transmitted to the extended output terminal E of the combo optical transceiver installed at the port 2 through the first connector, and an electrical signal is output through the default output terminal D of the combo optical transceiver installed at the port 2 through the second connector.

Figure 5:
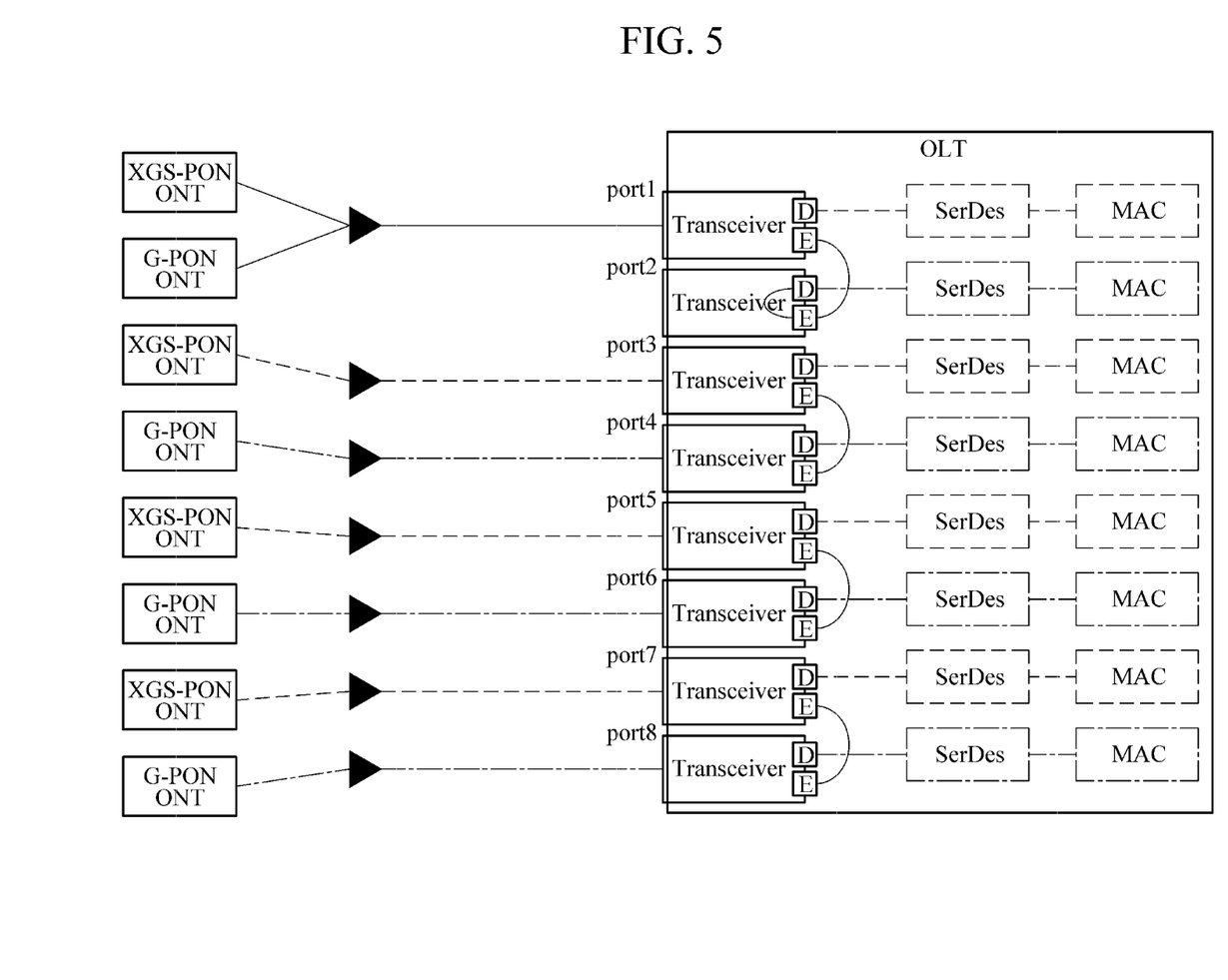
FIG. 5 illustrates an example in which optical signals of different transmission standards are input to a combo OLT of the following description that simultaneously supports the XGS-PON and the G-PON.

FIG. 5 illustrates an example in which optical signals of different transmission standards are input to a combo OLT of the following description that simultaneously supports the XGS-PON and the G-PON. The example of FIG. 5 shows a case in which a combo optical transceiver and a single optical transceiver of an individual standard are used simultaneously in an OLT of the following description, and only a port 1 and a port are set as one group and operate in the combo mode, and the other ports operate individually in a single mode. As illustrated in FIG. 5, the OLT of the following description may be flexibly configured and used without wasting resources, unlike the example of FIG. 2.

According to another embodiment of the following description, a first connector may be formed in a pattern on a printed circuit board (PCB) of the OLT provided with a first optical transceiver and a second optical transceiver. That is, the first connector may be formed in an electrically conductive pattern on the PCB of the OLT to electrically connect extended output terminals of optical transceivers installed at two neighboring ports.

According to another embodiment of the following description, the second connector may include a fastening portion having the same shape as an optical connector inserted into the second optical transceiver to be detachably fastened into the second optical transceiver, and a bridge portion for electrically connecting a default output terminal and an extended output terminal of an electrical signal I/O unit when the fastening portion is fastened into the second optical transceiver.

The fastening portion may have the same shape as an LC connector inserted into a general optical transceiver. When the fastening portion is inserted into the optical transceiver, the extended output terminal and the default output terminal of the second optical transceiver are electrically connected. In this case, the second optical transceiver may be a dummy transceiver. Therefore, the second optical transceiver may output an electrical signal, which is output from the extended output terminal of the first optical transceiver, through the default output terminal thereof.

An optical line terminal of the following description is capable of simultaneously supporting two standards and processing an optical signal without wasting resources even when an optical signal of only one standard is input to each port.

While the following description has been described above with respect to embodiments in conjunction with the accompanying drawings, the following description is not limited thereto and should be interpreted to cover various modifications that will be apparent to those of ordinary skill in the art. The claims are intended to cover such modifications.

What is claimed is:

1. An optical line terminal comprising:
a first optical transceiver configured to transmit or receive one or more optical signals among an optical signal of a first standard and an optical signal of a second standard through an optical cable inserted thereinto, and convert between an optical signal and an electrical signal;
a second optical transceiver installed at a port adjacent to a port at which the first optical transceiver is installed, and configured to transmit or receive an optical signal of the first or second standard through an optical cable inserted thereinto and convert between an optical signal and an electrical signal, and
a first connector configured to electrically connect an extended output terminal of an electrical signal input/output unit of the first transceiver and an extended output terminal of an electrical signal input/output unit of the second optical transceiver,
wherein, if an optical cable is not inserted to the second optical transceiver, the optical line terminal further comprises:
a second connector configured to connect the extended output terminal and a default output terminal of the electrical signal input/output unit of the second optical transceiver, wherein the electrical signal output through the extended output terminal of the first optical transceiver is output through the default output terminal of the second optical transceiver through the first connector and the second connector.

2. The optical line terminal of claim 1, wherein the first connector is formed in a pattern on a printed circuit board (PCB) provided with the first optical transceiver and the second optical transceiver.

3. The optical line terminal of claim 1, wherein the first and second optical transceivers are small form-factor pluggable (SFP) or SFP+optical transceivers.

4. The optical line terminal of claim 1, wherein the first optical transceiver is a first type optical transceiver and the second optical transceiver is a second type optical transceiver, the optical line terminal consists of eight optical line transceivers, four of which are first type optical transceivers and four of which are second type optical transceivers.

5. The optical line terminal of claim 4, wherein the four first type optical transceivers and the four second type optical transceivers are alternately disposed.

6. The optical line terminal of claim 1, wherein an optical signal of the first standard comprises a wavelength of 1,310 nm upstream and 1,490 nm downstream, and the second standard comprises a wavelength of 1,270 nm upstream and 1,577 nm downstream.

7. An optical line terminal, comprising:
a first optical transceiver configured to transmit or receive one or more optical signals among an optical signal of a first standard and an optical signal of a second standard through an optical cable inserted thereinto, and convert between an optical signal and an electrical signal;
a second optical transceiver installed at a port adjacent to a port at which the first optical transceiver is installed, wherein:
the optical line terminal is configured to operate in one of first and second modes,
in the first mode, the second optical transceiver is configured to transmit or receive an optical signal of the first or second standard through an optical cable inserted thereinto and convert between an optical signal and an electrical signal, and
in a second mode, the second optical transceiver is configured to:
receive, at an extended output terminal of the second optical transceiver, the electrical signal output from the extended output terminal of the first optical transceiver via a first connector;
forward the received electrical signal to a default output terminal of the second optical transceiver via a second connector; and
output the received electrical signal from the default output terminal of the second optical transceiver.

8. The optical line terminal of claim 7, wherein the first connector is formed in a pattern on a printed circuit board (PCB) provided with the first optical transceiver and the second optical transceiver.

9. The optical line terminal of claim 7, wherein, in the second mode, an optical cable is not inserted to the second optical transceiver.

10. The optical line terminal of claim 7, wherein the first connector is presented both in the first mode and the second mode, and the second connector is presented only in the second mode but not in the first mode.

11. The optical line terminal of claim 7, wherein the first and second optical transceivers are small form-factor pluggable (SFP) or SFP+ optical transceivers.

12. The optical line terminal of claim 7, wherein the first optical transceiver is a first type optical transceiver and the second optical transceiver is a second type optical transceiver, the optical line terminal consists of eight optical line transceivers, four of which are first type optical transceivers and four of which are second type optical transceivers.

13. The optical line terminal of claim 12, wherein the four first type optical transceivers and the four second type optical transceivers are alternately disposed.

14. The optical line terminal of claim 7, wherein an optical signal of the first standard comprises a wavelength of 1,310 nm upstream and 1,490 nm downstream, and the second standard comprises a wavelength of 1,270 nm upstream and 1,577 nm downstream.

\* \* \* \* \*